Sept. 14, 1965   E. LIESER   3,205,796
PHOTOELECTRIC EXPOSURE METER WITH VARIABLE ANGULAR FIELD
Filed Oct. 22, 1962
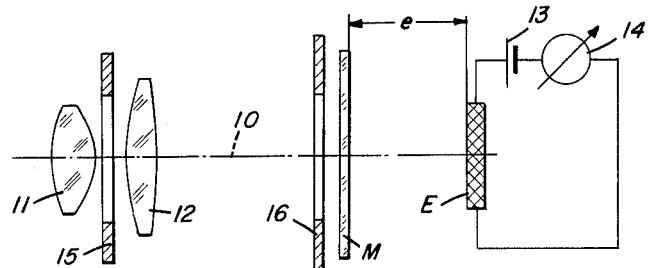
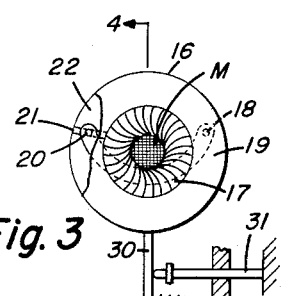
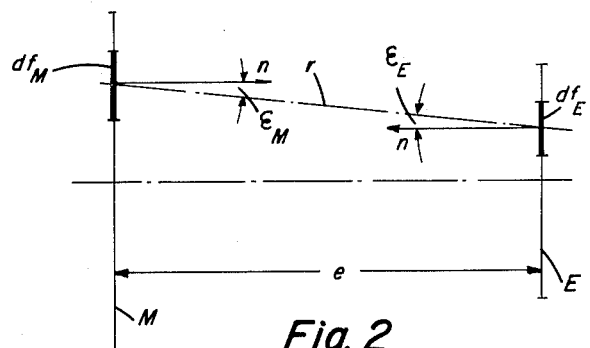
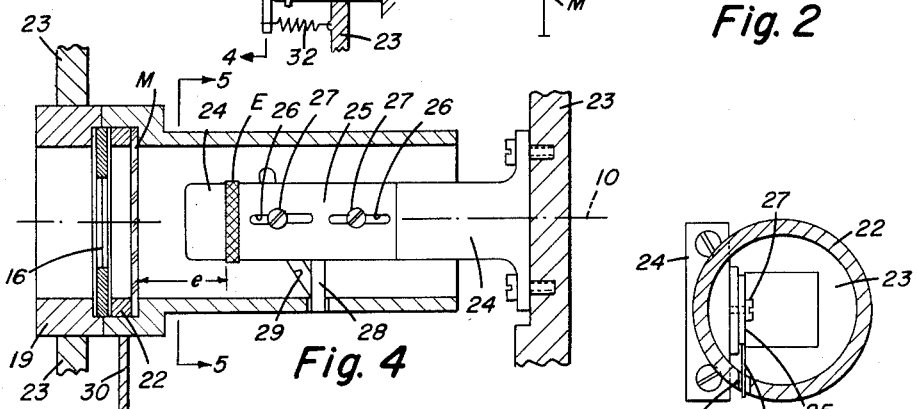
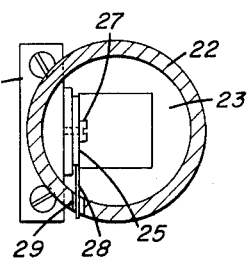
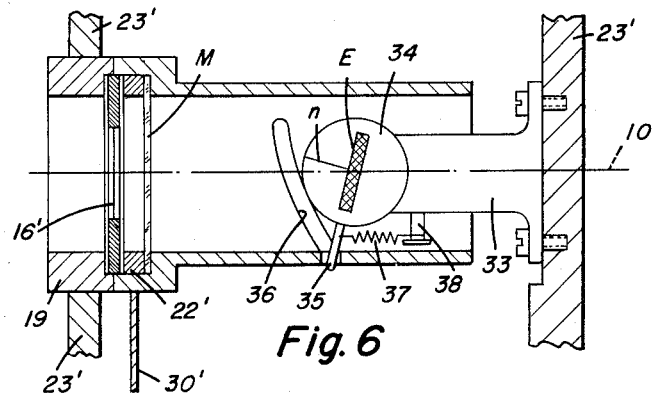
ERNST LIESER
INVENTOR.
BY R. Frank Smith
Robert W. Hampton
ATTORNEYS 3,205,796
PHOTOELECTRIC EXPOSURE METER WITH
VARIABLE ANGULAR FIELD
Ernst Lieser, Stuttgart-Vaihingen, Germany, assignor to
Eastman Kodak Company, Rochester, N.Y.
Filed Oct. 22, 1962, Ser. No. 232,089
Claims priority, application Germany, Oct. 28, 1961,
K 45,065
19 Claims. (Cl. 95—10)

This invention relates to light meters or photoelectric exposure meters, and more particularly to the type of photoelectric meter having means to vary the angular field of light acceptance.

A number of such devices have been designed for the broad purpose of varying the angular field. For example, a variable light lens may be mounted in front of the light receiving part of the exposure meter, and depending on the setting of the lens, the concentration of light flux falling on the light sensitive photocell may be changed to simulate a change of angular field. Another example includes the use of tube-shaped attachments of various lengths to be selectively placed in front of the photocell part of the light meter. A variation of the latter for use with an exposure meter built into a photographic camera may include the provision of a diaphragm movable along the optical axis of the exposure meter, the diaphragm being coupled with the device for changing the camera taking-lens in such a way that the angular field of the photocell of the exposure meter corresponds with the angular field of the selected taking-lens.

Still another example contemplates the use of a variable diaphragm, such as an iris diaphragm, placed in front of the photocell. Thus, closing of the diaphragm results in a corresponding decrease in the solid angle of the light flux covered by the photocell.

However, when varying the angular field of light acceptance as disclosed above, the full light flux falling on the photocell is changed, and incorrect measurements result if no compensation is made for retaining a constant predetermined light flux falling on the photocell during the variation of the angular field.

An important object of the invention therefore resides in the provision of a simple device for compensation of the light flux falling on a photocell.

Another object is in the provision of mechanical or optical means for varying the angular field of light acceptance of the photocell of a light meter, and means to adjust the relative positions of the optical means and the photocell to obtain a constant light flux falling on the photocell.

In one embodiment of the invention, the light flux is kept constant by changing the distance between the photocell and the associated optical means, and another embodiment of the invention may comprise the maintenance of a constant light flux by a variation of the angle between the normal of the photocell and the optical axis.

Further objects of the invention will be apparent from the following description, reference being made to the accompanying drawings, wherein:

FIG. 1 is a schematic side view of a photoelectric exposure meter according to the invention, FIG. 2 is an analytic representation of the factors involved in the invention, FIG. 3 is a front view of an iris diaphragm and photocell suitable for use with the invention, FIG. 4 is a side view taken on cross-section of line 4—4 of FIG. 3, FIG. 5 is a cross-sectional view taken on line 5—5 of FIG. 4, and FIG. 6 is a side cross-sectional view of an alternate embodiment according to the invention.

Referring now to FIG. 1, a suitable photoelectric exposure meter employing the invention includes an optical axis 10 on which are arranged a lens system consisting of lenses 1 and 2 and a photosensitive cell E. The photocell E, disposed for illumination by scene light through the light-controlling means to be described later, may be connected in an electrical circuit to a meter 14 or an automatic diaphragm by means of a current source 13 in a manner already known in the art. This is disclosed, for example, in U.S. Patents Nos. 2,209,639 and 2,975,693.

An adjustable diaphragm 15, such as an iris diaphragm, may be positioned with the lens system. By adjustment of diaphragm 15, compensation may be made for filter factors, exposure times, and initial apertures of interchangeable lenses. Operation of such a diaphragm 15, as for example in the compensation for filter factors, is fully disclosed in U.S. Patent 2,975,693.

Between the lens system and the photosensitive cell E are positioned a variable diaphragm 16 and a ground glass plate M immediately adjacent thereto. The angular field of light acceptance of the photocell E is defined by the setting of diaphragm 16. Glass plate M is ground in order to effect an even illumination over its entire illuminated area, which area corresponds to the size of the aperture of the diaphragm 16.

In order to ensure an exact light measurement at any setting of the diaphragm 16, the relative positions of the photocell E and the optical means or ground glass plate M must be correspondingly adjusted. For example, if the aperture area of diaphragm 16 is to be reduced, a corresponding adjustment may be effected by reducing the distance $e$ between the photocell E and the glass plate M. The adjustments must be effected so that the light flux falling on the photocell E remains constant.

FIG. 2 represents the factors of FIG. 1 which should be taken into consideration in order to maintain the constant light flux. With respect to FIG. 2, the following equation for the light flux is valid:

$$F = \int_M \int_E I df_M df_E \cos \epsilon_M \cos \epsilon_E \frac{1}{r^2} = \text{const.}$$

where F equals the total light flux, $df_M$ and $df_E$ are surface elements of glass plate M and photocell E, $\epsilon_M$ and $\epsilon_E$ are angles between the normal $n$ and the connecting line $r$ of the two surface elements $df_M$ and $df_E$, and I is the total intensity in the diaphragm plane.

If plate M and photocell E are to remain parallel, $\epsilon_M$ and $\epsilon_E$ are equal to $\epsilon$ and $r$ may be generalized as $$\frac{e}{\cos \epsilon}$$

In such a case the following formula results:

$$F = \int_M \int_E I df_M df_E \cos^4 \epsilon \frac{1}{e^2} = \text{const.}$$

Dividing F by I, or $$\frac{F}{I}$$

results in G, the geometrical flow of the light. In this case the following formula would be valid:

$$G = f(M, e)$$

Thus it can be seen that when changing M, $e$ has to be changed in a manner such that G remains constant, the surface of E being constant because of the parallel relation.

In practice, the optical means or ground glass plate M is not an ideal cosine radiator as was assumed by the above formula. Therefore, the change of distance from $e$ depends on the size and surface of M, according to a somewhat modified function.

The sensitivity of the exposure meter can be increased by grinding glass plate M so that the scattering angles are very small and the light elements cover only the displacement of photocell E. A further improvement would be to use a field lens as the optical means M.

FIG. 3 illustrates a usable form of diaphragm. The blades 17 of diaphragm 16 are supported at one end by pins 18 in corresponding bores of a first ring 19 and are supported at the opposite end by pins 20, which are guided in corresponding slots 21 of a second ring 22. Rings 19 and 22 are relatively coaxially rotatable, the forward ring 19 being preferably stationary.

As shown in FIG. 4, diaphragm 16 is adjusted between stationary ring 19 and rotating ring 22. Ground glass plate M is suitably fixed within rotating ring 22. Stationary ring 19 may be fixed with respect to a meter or camera body 23. A fixed arm 24 is also attached to the body 23 and extends into the rotating ring 22. Slidably supported on arm 24 is a photocell holder 25 having axially elongated slots 26. Screws 27 passing through slots 26 are fixed to the arm 24. Photocell E is mounted at the forward part of holder 25.

Extending outwardly from holder 25 is a control pin 28. Control pin 28 projects into a cam slot 29 which is configured in order to obtain the functional relation between the distance $e$ and the glass plate M described hereinabove. Rings 19 and 22 may have suitable indicia inscribed thereon, and adequate access means may be provided for rotation of the ring 22. In operation, when diaphragm B is to be readjusted in order to alter the angular field of light to pass to the photocell, rotating ring 22 is turned to the appropriate index. Simultaneously therewith, control pin 28 and thereby holder 25 and photocell E are moved linearily along the optical axis to establish the corresponding distance, $e$.

Alternatively, when built into a camera, rotating ring 22 may be automatically adjusted to conform, for example, with the setting of the angular field of a taking lens. This may be done by the provision of an arm 30 resting against a stop pin 31 due to the tension of spring 32. The stop pin 31 is set by a surface of the interchangeable taking lens, or a variable cam surface of a zoom-type lens.

A further embodiment for compensating the light flux falling on the photocell E is shown in FIG. 6. Here the distance from the photocell E to the optical means M is not changed. Compensation for adjustment of the diaphragm 16' is made by rotating the photocell E so that the angle between the normal of the photocell E and the optical axis varies. Here the constant light flux F is achieved by varying $\epsilon_E$ of FIG. 2 with respect to $\epsilon_M$, as shown in the first stated formula.

In this case diaphragm 16 is similarly mounted between a stationary ring 19' and rotating ring 22'. Arm 33, fixed with respect to body 23', extends into the ring 22'. A rotatable disc 34 is pivoted at its center to the arm 33, and photocell E is fixed on a diameter of disc 34. Similarly, a control stud 35 extends radially outward from disc 34 and projects through a control cam slot 36. Control slot 36 is designed in order to obtain the result in the above-mentioned formula. A tension spring 37 is fixed at its ends to stud 35 and another pin 38 attached to arm 33. In this way a firm contact between stud 35 and slot 36 is maintained.

In operation of this embodiment, the setting of diaphragm 16 is again achieved by manual or automatic rotation of ring 22', thereby simultaneously rotating disc 34 and photocell E through the cooperation of cam slot 36 and stud 35.

While the invention is useful with any type of photosensitive material, it is particularly useful with extremely small photocells such as cadmium sulfide resistances, since the prior art required relatively large light sensitive surfaces to attempt to avoid the problem. Therefore, the need for alteration of light flux by grey filters or other light attenuating means for the use of adjustable resistances in the photocell electric circuit may be eliminated.

Although the invention has been described in detail with particular reference to preferred embodiments thereof, it is to be understood that variations and modifications can be expected within the scope and spirit of the invention as described hereinabove and as defined in the appended claims. It is particularly understood that the invention is applicable to light sensitive meters used separately or as part of a camera. It is to be further understood that the invention is applicable to cameras whether the diaphragm openings and exposure controls are automatically or semi-automatically controlled, or whether the taking lens is interchangeable, fixed or of the zoom type.

Moreover, the invention is usable with many types of photographic meter lens systems in addition to the one described above.

I claim:

1. In a photoelectric exposure meter for determining scene brightness and having an optical axis, the combination comprising: a photocell disposed on the optical axis for illumination by scene light, means for varying the angular field of light receivable by the photocell, optical means positioned on the optical axis intermediate the photocell and varying means to effect even illumination of the photocell, and means to adjust the position of the photocell relative to the optical means in response to the varying means to maintain a predetermined light flux falling on the photocell.

2. A photoelectric exposure meter according to claim 1 wherein the optical means comprises a ground glass plate, in a stationary predetermined position on the optical axis, the photocell being movable in response to the adjusting means.

3. In a photoelectric exposure meter for determining scene brightness and having an optical axis, the combination comprising: a photocell disposed on the optical axis for illumination by scene light, means for varying the angular field of light receivable by the photocell, optical means positioned on the optical axis intermediate the photocell and varying means to effect even illumination of the photocell, the photocell and optical means being disposed in a parallel space relationship, and means to adjust the relative positions of the photocell and optical means in response to the varying means to maintain a predetermined light flux falling on the photocell, the means to adjust the relative positions being operable to change the linear distance between the said photocell and optical means.

4. A photoelectric exposure meter according to claim 3 wherein the optical means comprises a ground glass plate.

5. The combination according to claim 3 wherein the linear distance is changeable according to the equation:

$$F = \int_M \int_E I df_M df_E \cos^4 \epsilon \frac{1}{e^2} = \text{constant}$$

wherein F is in the light flux, $df_M$ and $df_E$ are the surface elements of the optical means and photocell, respectively, $e$ is the distance between the photocell and optical means, I is the intensity of illumination in the varying means plane, and $\epsilon$ is the angle determined by a line connecting the surface elements $df_M$ and $df_E$ and the normal of each of said surface elements.

6. A photoelectric exposure meter according to claim 5 wherein the optical means comprises a ground glass plate.

7. In a photoelectric exposure meter for determining scene brightness and having an optical axis, the combination comprising: a photocell disposed on the optical axis for illumination by scene light, means for varying the angular field of light receivable by the photocell, optical means positioned on the optical axis intermediate the photocell and varying means to effect even illumination of the photocell, and means to adjust the relative positions of the photocell and optical means in response to the varying means to maintain a predetermined light flux falling on the photocell, the means to adjust the relative positions being operable to change the angle of the photocell determined by the normal of the photocell and the optical axis.

8. A photoelectric cell according to claim 7 wherein the angle of the photocell is changeable according to the relation:

$$F = \int_M \int_E I df_M df_E \cos \epsilon_M \cos \epsilon_E \frac{1}{r^2} = \text{constant}$$

wherein F is the light flux, $df_M$ and $df_E$ are surface elements of the optical means and photocell, respectively, $r$ is the distance between the surface element $df_E$ of the photocell and the surface element $df_M$ of the optical means, I is the intensity of illumination in the plane of the varying means, $\epsilon_M$ is the angle between the normal of the surface element $df_M$ and a line connecting the surface elements $df_M$ and $df_E$, and $\epsilon_E$ is the angle between the normal of the surface element $df_E$ and said line connecting the surface elements.

9. A photoelectric exposure meter for determining scene brightness and having an optical axis comprising: a stationary ring coaxial with the optical axis, a rotatable control ring coaxial with the stationary ring and optical axis, a photocell disposed for illumination along the optical axis, means responsive to the rotation of the control ring for varying the angular field of light receivable by the photocell, optical means intermediate the photocell and angular field varying means for effecting even illumination of the photocell, and means responsive to the rotation of the control ring for changing the position of the photocell relative to the optical means in order to maintain a predetermined light flux falling on the photocell.

10. A photoelectric exposure meter according to claim 9 wherein the varying means comprises an iris diaphragm having a plurality of elongated vanes, an end of each of which is pivoted to the stationary ring and the other end of each pivoted to the control ring.

11. A photoelectric exposure meter according to claim 9 wherein the optical means comprises a ground glass plate in a stationary position on the optical axis, the photocell being movable in response to the changing means.

12. A photoelectric exposure meter according to claim 9 and further comprising stationary arm means, means mounting the photocell on the stationary arm means for linear sliding movement of the photocell along the optical axis, and wherein said means for changing the position of the photocell comprises cooperating pin and cam means.

13. A photoelectric exposure meter according to claim 12 wherein the photocell is disposed within the control ring, and wherein the cooperating pin and cam means comprises a pin fixed relative to said photocell for linear movement therewith and a cam slot defined by the control ring.

14. A photoelectric exposure meter for determining scene brightness and having an optical axis, comprising: a stationary ring coaxial with the optical axis; a rotatable control ring coaxial with the optical axis and stationary ring; a photocell disposed for illumination along the optical axis; means responsive to the rotation of the control ring for varying the angular field of light receivable by the photocell; and means responsive to the rotation of the control ring for changing the position of the photocell in order to maintain a predetermined light flux falling on the photocell, the means for changing the position of the photocell including stationary arm means, means pivotably mounting the photocell on the arm means for rotation relative to the optical axis, and cooperating stud and cam means operatively rotating the photocell in response to rotation of the control ring.

15. A photoelectric exposure meter according to claim 14 wherein the photocell is disposed within the control ring, and wherein the cooperating stud and cam means comprises an axially extending stud fixed with respect to said photocell for rotation therewith, and a cam slot defined by the control ring.

16. The combination according to claim 14 and further comprising optical means intermediate the photocell and means for varying the angular field, said optical means effecting even illumination of the photocell.

17. A photoelectric exposure meter according to claim 16 wherein the optical means comprises a ground glass plate.

18. In a photographic camera having taking lens of variable angular field, a taking lens diaphragm, and means for regulating said diaphragm as a function of the scene brightness, the improvements comprising a photoelectric exposure meter having an optical axis and comprising stationary wall means defining an opening coaxial with the optical axis, a rotatable control ring coaxial with said opening and optical axis, a photocell disposed for illumination along the optical axis, a radially outwardly-extending positioning arm fixed to said control ring, means for rotating the positioning arm and control ring in response to changes in the angular field of the taking lens, means responsive to the rotation of the control ring for varying the angular field of light receivable by the photocell, optical means intermediate the photocell and angular field varying means for effecting even illumination of the photocell, and means responsive to the rotation of the control ring for changing the position of the photocell relative to the optical means to maintain a predetermined light flux falling on the photocell.

19. The improvement according to claim 18 wherein the angular field varying means comprises an iris diaphragm, and the optical means comprises a ground glass plate.

References Cited by the Examiner

UNITED STATES PATENTS

| 2,309,403 | 1/43 | Kosken | 95—44 |
| 2,518,718 | 8/50 | Rath | 95—44 |
| 2,959,092 | 11/60 | Faulhaber | 95—10 |

FOREIGN PATENTS 1,214,121  11/59  France.

NORTON ANSHER, *Primary Examiner.*
DELBERT B. LOWE, *Examiner.*